United States Patent Office 3,257,282
Patented June 21, 1966

3,257,282
PROPHYLACTIC DENTAL PASTE COMPOSITIONS COMPRISING ZIRCONIUM SILICATE
Joseph C. Muhler, Indianapolis, Ind., assignor to Indiana University Foundation, Indiana Memorial Union, Bloomington, Ind.
No Drawing. Filed Oct. 8, 1963, Ser. No. 314,602
7 Claims. (Cl. 167—93)

This invention relates to prophylactic paste compositions and to manners of formulating and utilizing such compositions and more particularly to such compositions containing a unique zirconium silicate cleaning and polishing agent which not only serves to clean and polish teeth but also enhances the effectiveness of certain anticariogenic components of the paste compositions, such as fluoride, stannous, or zirconium ions or complex combinations thereof.

The past decade has witnessed a remarkable advance in the art of anticariogenic dentifrice preparations in that means have been established for utilizing fluoride-containing compounds for reducing the incidence and limiting the severity of carious teeth. The most efficacious generally known approach for achieving these results by means of a dentifrice preparation is predicated inter alia upon the utilization of a polishing agent such as heat-treated calcium orthophosphate or calcium salts of molecularly dehydrated phosphoric acids such as calcium pyrophosphates, calcium metaphosphates, and calcium polyphosphates (as set forth and described in United States Patent No. 2,876,166, patented March 3, 1959), and upon the utilization of an anticariogenic component in the form of stannous ions in conjunction with fluoride ions, as for example, by providing a stannous ion reservoir in combination with stannous fluoride (as set forth and described in United States Patent No. 2,946,725, patented July 26, 1960). Recently, a novel and improved anticariogenic compound, stannous zirconium hexafluoride ($SnZrF_6$), has been suggested for caries prophylaxis (as set forth and described in a co-pending United States patent application entitled Stannous Fluorozirconate and Compositions for Caries Prophylaxis Containing Same, filed June 17, 1963, in the name of Dr. Joseph C. Muhler, Ser. No. 291,173).

It has heretofore been attempeted to utilize the beneficial aspects of fluoride-containing preparations in professional prophylaxis treatments, that is, the application of a specially formulated prophylatic paste to the teeth by dentists or dental hygienists in a routine dental prophylaxis. The first such attempt was predicated upon utilization of sodium fluoride, a known effective anticariogenic agent when used in aqueous solution, in conjunction with calcium carbonate as the cleaning and polishing agent (see Bibby, "Fluoride Mouth Washes, Fluoride Dentifrices, and Other Uses of Fluorides in Control of Caries," Journal of Dental Research, 27: 367, June 1948, Bibby et al., "Preliminary Reports on the Effect on Dental Caries of the Use of Sodium Fluoride in a Prophylatic Cleaning Mixture and in a Mouthwash," op. cit. 207). However, apparently due to the inactivation of the fluoride ion by the cleaning and polishing agent, this method did not prove satisfactory and was not adopted by the dental profession to any considerable extent.

The second significant phase of professional prophylatic paste development involved the utilization of silica powder and silicone in combination with stannous fluoride (see Hester et al., "Clinical Acceptance of Stannous Fluoride Prophylaxis Paste," Journal of Dentistry for Children, 27: 282, 1960, Detamore et al., "An Experimental Stannous Fluoride-Silex-Silicone Dental Prophylaxis Paste With Anticariogenic Potentialities: IV, The Progressve Development of a Clinically Acceptable Formulation," Southern California State Dental Association, vol. XXIV, No. 2: 38, February 1961). While promising anticariogenic benefits were indicated by laboratory treatment with the stannous fluoride-silica-silicone prophylactic paste, serious drawbacks to actual clinical utilization of such a paste were presented. This paste failed to effectively clean and polish the teeth and had the undesirable attribute of causing the patient to regurgitate upon administration of the paste to the oral cavity.

The next significant step in the development of a suitable prophylactic paste was the combination of lava pumice and anticariogenic fluoride components, such as stannous fluoride (see Dudding and Muhler, "Technique of Application of Stannous Fluoride in a Compatible Prophylactic Paste and as Topical Agent," Journal of Dentistry for Children, vol. 29: 219, 1962; Mericle and Muhler, "Studies Concerning the Anti-Solubility Effectiveness of Different Stannous Fluoride Prophylaxis Paste Mixtures," Journal of Dental Research, vol. 42, No. 1, January-February 1953). This technique has found commercial acceptance and is in current practice. Moreover, it appears that a combination of the lava pumice prophylactic paste treatment with a topical stannous fluoride application and even with a daily utilization of a stannous fluoride dentifrice enhances the anticariogenic results obtained by the prophylaxis (see Gish and Muhler, "Multiple Use of Fluoride and Dental Caries," 40th General Meeting, International Association for Dental Research, Abstract No. 147, 1962, Bixler and Muhler, "The Combined Effects of Using a Compatible Stannous Fluoride Prophylaxis Paste, Topical Stannous Fluoride, and Crest [a trademark of the Procter & Gamble Co.] on Caries Reduction in Children," op. cit., Abstract No. 149).

It has now been discovered that prophylactic paste compositions predicated upon the utilization of zirconium silicate as the cleaning and polishing agent will markedly enhance the effectiveness of anticariogenic adjuvants contained in the paste. The term anticariogenic adjuvants as utilized herein is intended to encompass compounds capable of developing anticariogenic constituents in biologically available form in the oral cavity, such as stannous, fluoride, and zirconium salts and especially the preferred stannous fluoride and stannous zirconium hexafluoride, as hereinafter described.

Zirconium silicate is of course a well-known industrial abrasive which is used for the grinding of glass and ceramics; however, this material has not heretofore been proposed for use in the oral cavity. The extreme hardness and abrasive characteristics exhibited by zirconium silicate would suggest to one skilled in the art that zirconium silicate would be unsuitable for use on the teeth. Measured in terms of the dental abrasion value characteristic (as set forth and described in United States Patent No. 2,876,168, patented March 3, 1959), commercially available zirconium silicate exhibits a dental abrasion value ranging from about 1000–2000, as compared to about 400–600 for calcium pyrophosphate as utilized in a commercially available tooth paste formulation.

However, it has now been discovered in accordance with the subject invention that zirconium silicate may be utilized as a cleaning and polishing agent in a professionally applied prophylactic paste composition without harm to the teeth. When zirconium silicate is combined with anticariogenic fluoride-containing adjuvants, the resultant prophylactic paste is markedly superior to any previously known prophylaxis treatment insofar as reduction of dental caries is concerned. The anticariogenic attributes of a zirconium silicate prophylactic paste are so effective that semi-annual or even annual prophylaxis treatments can appreciably lower the caries incidence rate. When applied on such a relatively infrequent basis (as compared, for example, to daily toothpaste applications), the high dental abrasion characteristics of zirconium silicate actually serve as an advantage rather than as a detriment since the teeth are safely and effectively cleaned and polished in a superior manner to any previously known technique.

Zirconium silicate has been found to be suitable as the basic component for the prophylactic paste described herein after exhaustive in vitro and in vivo experimentation. This compound exhibits the desired requisites of a prophylactic paste cleaning and polishing agent in that it both cleans and polishes the tooth enamel to a high luster without developing any objectionable tastes in the oral cavity. Moreover, the incorporation of zirconium silicate as a cleaning and polishing agent in prophylactic paste compositions has been found not only to increase the biological availability of ionizable fluorine, tin, and other anticariogenic adjuvants but also to reduce substantially the solubility of tooth enamel in acid.

Accordingly, it is a general object of this invention to provide a prophylactic paste composition containing biologically available anticariogenic adjuvants for the reduction of dental caries.

In a more specific sense, it is an object of this invention to provide a prophylactic paste cleaning and polishing agent which serves to enhance the effectiveness of the anticariogenic adjuvants contained in the prophylactic paste.

It is a related object of this invention to provide such a cleaning and polishing agent which exhibits compatibility characteristics with anticariogenic adjuvants such that a greater percentage of biologically available constituents is evidenced and which can effectively clean and polish teeth.

It is another object of this invention to provide a cleaning and polishing agent which is useful in prophylactic paste formulations for hygienic, cosmetic, and prophylactic purposes.

It is yet another object of this invention to provide a prophylactic paste composition which serves to reduce the acid solubility of tooth enamel.

It is yet another object of this invention to provide a prophylactic paste composition characterized by a novel combination of a zirconium silicate cleaning and polishing agent with prophylactic components.

It is a still further object of this invention to provide a prophylactic paste composition which reduces dental caries without causing enamel pigmentation or discoloration of the tooth enamel and which in addition obviates any damage to gingival tissues by virtue of the prophylaxis treatment.

These and other objects, advantages, and features of the subject invention will hereinafter appear, and, for purposes of illustration, but not of limitation, various exemplary embodiments of the subject invention are hereinafter described in detail.

As previously indicated, the invention is predicated upon the discovery that zirconium silicate functions as a safe and effective cleaning and polishing agent and as a compatible carrier for anticariogenic adjuvants in a prophylaxis paste composition. Preferably, the zirconium silicate is provided in a prophylactic base so that a freshly prepared aqueous solution of the anticariogenic components may be admixed therewith just prior to topical application of the paste to the oral cavity. The prophylactic base preferably includes, in addition to the zirconium silicate, a bleaching pigment; a binder or thickener; a humectant; and flavoring agents, as required. A wide latitude of choice for such ingredients, both quantitatively and qualitatively, is available, as is well known to a practitioner skilled in the art.

The formulation for such a prophylactic base comprises from about 50 to 80% zirconium silicate as a cleaning and polishing agent, with the remaining 50 to 20% of the base being conventional components for prophylactic compositions, such as a bleaching agent, a binder, a humectant, and a flavoring agent. The preferred formulation, on a relative parts by weight basis, is as follows:

| | |
|---|---|
| Zirconium silicate as a cleaning and polishing agent | 50–80 |
| Bleaching agent | 1–6 |
| Binder | 0.1–1.0 |
| Humectant | 10–20 |
| Flavoring agents | Up to 2.0 |

The bleaching pigment may take the form of a titanium dioxide powder. The flavoring agents are conventional ingredients, such as oil of wintergreen, oil of peppermint, oil of spearmint, oil of sassafras, oil of anise, and the like. Additionally, small amounts of sweetening agents such as saccharin, dextrose, levulose, sodium cyclamate, and the like may be added as flavoring components. The preferred binders are water-soluble salts of cellulose ethers, such as sodium carboxymethyl cellulose and sodium carboxymethyl hydroxyethyl cellulose. Natural gums, such as gum karaya, gum arabic, and gum tragacanth may be used as thickeners, but are less preferred since they may tend to cause undesirable odors or tastes in the prophylactic paste composition. Colloidal magnesium aluminum silicate or finely divided silica can be used as a part of the thickening agent for improvement in texture, but ordinarily these materials are not desired by virtue of taste factors. Suitable humectants for the prophylactic paste base include glycols, glycerine, sorbital and other polyhydric alcohols. The proportions of the foregoing additional ingredients may be reduced or increased providing consistency is maintained by suitable adjustment in the amounts of the other ingredients.

A prophylactic base formulated in the foregoing manner may be combined with suitable anticariogenic adjuvants in the following manner. Preferably, the prophylactic base is supplied as a non-aqueous component of a prophylaxis kit which also contains a solid adjuvant component and suitable measuring and mixing devices so that the adjuvant component can be admixed with water and so that the resultant combination of adjuvant and water can be mixed with the prophylactic base just prior to application of the resultant prophylactic paste to the teeth. The adjuvant component may comprise water soluble fluoride salts including $SnF_2$, $NaF$, $SnF_4$, $KF$, $InF_3$, $PdF_2$, $FeF_2$, and $LiF$, as well as more complex water-soluble fluoride-containing adjuvants such as fluosilicates, e.g., $Na_2SiF_6$, fluozirconates, e.g., $CaZrF_6$, $Na_2ZrF_6$, $K_2ZrF_6$, $SnZrF_6$, fluostannites, e.g., $NaSnF_3$, fluoborates, e.g., $NaBF_4$, fluotitanates, e.g., $NaTiF_5$, and fluogermanates, e.g., $K_2GeF_6$, $Zr(GeF_6)_2$, and mixed halides, e.g., $SnClF$ and $Sn_2ClF_3$. Mixtures of suitable adjuvants can also be utilized. Preferably, the adjuvant should be presented in the form of fluoride-containing compounds capable of supplying both fluoride and stannous ions or combinations thereof, for example with an additional component, such as zirconium ions, in biologically available form. The preferred ingredients in order of preference are $SnZrF_6$ and $SnF_2$. $SnZrF_6$ (stannous zirconium hexafluoride or stannous fluozirconate) appears to be the best anticariogenic fluoride-containing adjuvant now known to the dentifrice and prophylactic arts, especially by virtue of its superior taste, lack of enamel pigmentation, and non-gingival attack attributes, along with its increased anticariogenic effectiveness This compound and the manner of formulation thereof are described in detail in the previously identified copending application.

In general terms, from about 0.05–1 part by weight of fluoride-containing adjuvants may be admixed with 1 part water (depending on the particular adjuvant utilized), and the resultant composition may be added to the previously described prophylactic base in a ratio range of from about 1–3 parts by weight prophylactic base (i.e., from about 0.5–2.4 parts by weight zirconium silicate) per 1 part by weight of water (i.e., per 0.05–1 part by weight of adjuvant). The preferred formulation is achieved by utilizing a ratio range of about 2 parts by weight prophylactic base (i.e., from about 1–1.6 parts by weight zirconium silicate) per 0.2–0.4 part by weight $SnF_2$ or per 0.65–1 part by weight $SnZrF_6$ (i.e., admixed with 1 part water). These ratios yield desirable anticariogenic adjuvant concentration levels for safe and effective utilization of the prophylactic paste, although it will be apparent to one skilled in the art that the uilization of alternate fluoride-containing adjuvants as above-described can be suitably porportioned as required for combination with the described prophylactic base. The relatively greater amount of $SnZrF_6$ as compared to $SnF_2$ which can be safely and effectively utilized accounts for the preferred status of the $SnZrF_6$ in the practice of the subject invention. $SnZrF_6$ can be utilized on almost an equal weight basis relative to the $ZrSiO_4$ for maximum anticariogenic effectiveness since the $SnZrF_6$ will not cause enamel discoloration or gingival tissue damage at such concentration levels. Enamel discororation and gingival tissue damage attributes generally serve to render undesirable the utilization of $SnF_2$ and of other fluoride-containing adjuvants at the high concentration levels at which $SnZrF_6$ may be utilized.

In actual practice, formulation of a prophylactic paste in accordance with the foregoing description may be readily accomplished by a dentist or dental hygienist from the non-aqueous prophylactic base and the anticariogenic adjuvant in kit form. A gelled slurry of acceptable consistency is compounded to suit the exigencies of a particular application. The following procedure is preferred for thorough cleansing and polishing of the teeth and for effective anticariogenic prophylaxis (on an annual or semi-annual basis as required).

Each tooth is thoroughly scaled in order to remove all calculus and soft debris. After scaling is completed, the prophylactic base is dispensed into a measuring cup (which can be supplied with the prophylaxis kit), and the anticariogenic adjuvant (in combination with water) is added to the cup to form the prophylactic paste. By using a soft rubber cup and an excess of the prophylactic paste, the applicator polishes the buccal-labial surfaces of the maxillary right quadrant. Each surface of the tooth is treated for at least ten seconds. Then the lingual surfaces of the maxillary right quadrant are correspondingly treated. Unwaxed dental floss (which may be supplied with the prophylaxis kit) is used in all interproximals and preferably is utilized with an excess of the prophylactic paste. The patient may be allowed to rinse thoroughly with water any time during the treatment.

After rinsing, the lingual one-half of the maxillary left quadrant is polished and the patient is allowed to rinse. The buccolabial one-half of the maxillary left quadrant is polished, but the patient is not allowed to rinse until all of the interproximal contacts have been cleaned and polished with the unwaxed dental floss. The buccal and lingual surfaces of the mandibular right molars and bicuspids are then polished. Unwaxed dental floss is used in the interproximals before rinsing.

The mandibular anterior teeth are polished next, both labially and lingually, and the interproximal areas are polished with the unwaxed dental floss before rinsing is allowed. The buccal and lingual surfaces of the mandibular left molars and bicuspids are then polished, the interproximals are dental flossed, and the patient is allowed to rinse. The occlusal surfaces and all pits and fissures are then polished with a stiff bristle prophylactic brush and the prophylactic paste. The patient is then allowed to rinse his mouth as thoroughly as possible.

Clinical studies of prophylaxis treatment of human teeth by means of a zirconium silicate prophylactic paste formulation as described herein indicate a marked superiority of the zirconium silicate, both as an effective cleaning and polishing agent and as a fluoride and stannous tin compatible carrier vehicle. In order to assess the effectiveness of zirconium silicate as a compatible carrier vehicle for anticariogenic adjuvants, two analytical techniques may be employed, namely, determinations of percentage availability values and of reduction in tooth enamel solubility.

Percentage availability refers to a comparison of an ionic concentration level for a combination of carrier vehicle and of adjuvant relative to the corresponding ionic concentration level for a reference solution of the adjuvant without the carrier vehicle (e.g., an aqueous solution of the adjuvant maintained at a reference ionic concentration level, such as 1000 p.p.m. fluoride). A percentage ratio of the ionic concentration level for the combination solution relative to the reference solution is expressed as a percentage availability (e.g., a combination solution of carrier vehicle and stannous fluoride which analyzes 900 p.p.m. fluoride concentration compared to a reference solution of stannous fluoride at 1000 p.p.m. fluoride exhibits a 90% availability insofar as ability to provide aqueous fluoride ions is concerned).

Table I shows exemplary percentage availability data determined in the foregoing manner for three adjuvants (i.e., $SnF_2$, $SnZrF_6$, and NaF at 1000 p.p.m. $F^-$) and for three cleaning and polishing vehicles (i.e., $ZrSiO_4$, $Ca_2P_2O_7$, and $CaCO_3$, the latter two being commercially utilized cleaning and polishing carrier vehicles for anticariogenic fluoride-containing adjuvants).

As is well known, dental caries is caused, at least in part, by solution of dental enamel in biologically produced acids of the oral cavity. Decreasing the solubility of dental enamel in such acids can significantly reduce the caries incidence. The effect of various agents in reducing the solubility rates of dental enamel in acid can be determined by a variety of tests well known in the art. The particular test for reduction in tooth enamel solubility (hereinafter referred to as ESR) described herein comprises a comparison of acid solubility of a given tooth before and after treatment in a given test solution. The data reported in the tables as Human Whole Tooth ESR is determined as follows: A non-carious human tooth is embedded in plastic resin with the clinical crown exposed (as per the technique described in Buttner and Muhler, "The Solubility of Intact Dental Enamel Surfaces Treated With Potential Anti-Cariogenic Agents," Journal of Dental Research, 37: 412, 1958). Each tooth is decalcified four times in 0.2 N pH 4 acetic acid for twenty minutes. The first two acid solutions are discarded, and the third and fourth decalcification solutions are analyzed for phosphorous by the colorimetric method (Fisk and Subbarrow, "The Colorimetric Determination of Phosphorous," Journal of Biological Chemistry, 66: 375, 1925). The mean value of the third and fourth decalcifications is used as the pre-treatment control value. Each tooth is rinsed in distilled water between decalcifications and immediately prior to the protective treatments. The protective treatments are preformed by applying a treatment-mixture to each surface of the tooth by means of a rubber prophylaxis cup for a period of fifteen seconds. Following this treatment, the tooth is rinsed thoroughly with water, blotted dry, and again decalcified in acetic acid for twenty mintues. The decalcification solution is then analyzed for phosphorus and compared with the pretreated control in order to determine the anti-solubility effectiveness of the treatment procedure. Phosphorus liberation before and after treatment is compared and is reported as a percentage reduction of enamel solubility (i.e., ESR).

Similarly, the data reported as Rat Tooth ESR is determined in vivo as follows: The teeth of a group of test rats are treated for ten consecutive days (thirty seconds per day), and thereafter the animals are sacrificed. Enamel solubility of the extracted teeth is then measured by acid solution of phosphorus after successive decalcifications, as in the previously described technique.

Tables II and III respectively report percentage reduction ESR values for rat and for human teeth by topical treatment of the respective teeth with the supernatant solutions of $SnF_2$ and $SnZrF_6$ respectively. Table IV reports similar ESR values for teeth treated with prophylactic pastes formulated with $SnF_2$ and $SnZrF_6$ as the anticariogenic adjuvants and with zirconium silicate, lava pumice, magnesium silicate, flour of pumice, calcium carbonate, and calcium silicate as the cleaning and polishing carrier vehicles. The formulations reported in Table IV utilize ratios of anticariogenic adjuvant and cleaning and polishing carrier vehicle corresponding to the previously described preferred ratios for formulation of a zirconium silicate adjuvant prophylactic paste.

As indicated by the foregoing data, the invention disclosed herein, in one of its aspects, provides a method for reducing the solubility of dental enamel comprising the application thereto of a prophylactic paste formulated from zirconium silicate combined with the combination of an anticariogenic adjuvant and water.

A specific example of a prophylactic paste which has been found suitable for the practice of the subject invention is as follows. The prophylactic base comprises in relative parts by weight:

Zirconium silicate as a cleaning and polishing agent __ 77
Titanium dioxide as a bleaching pigment _____ 4
Hydroxyethyl cellulose as a binder _____ 0.22
Glycerine as a humectant _____ 17.8
Sodium saccharin and masking flavors _____ 1.0

The prophylactic paste is formulated by dissolving 0.3 gram of $SnF_2$ in 1.0 cc. of distilled water and by adding the aqueous solution to 2.0 grams of the foregoing prophylactic base, giving approximately a 9% $SnF_2$ content to the resultant prophylactic paste. Alternatively, 0.93 gram of $SnZrF_6$ may be dissolved in 1.0 cc. of distilled water, and the aqueous solution can be added to 2.0 grams of the foregoing prophylactic base, giving approximately 24% $SnZrF_6$ content to the resultant prophylactic paste.

While the invention has been described with reference to certain exemplary embodiments thereof, it should be understood that various changes, modifications, and alterations may be effected in the materials utilized, in the proportions of materials, and in the manners of formulating the prophylactic base and the resultant prophylactic paste compositions, without departing from the spirit and the scope of the instant invention, as defined in the appended claims.

Table I.—A COMPARISON OF $Sn^{++}$ AND $F^-$ PERCENTAGE AVAILABILITY DATA FOR $SnF_2$, $SnZrF_6$, AND NaF SOLUTIONS WHEN COMBINED WITH 3 DIFFERENT CLEANING AND POLISHING VEHICLES (AT 1000 p.p.m. $F^-$)

| Cleaning and Polishing Vehicle | $SnF_2$ | | $SnZrF_6$ | | NaF |
|---|---|---|---|---|---|
| | Percent compat. Sn | Percent compat. F | Percent compat. Sn | Percent compat. F | Percent compat. F |
| $ZrSiO_4$ | 93.1 | 98.9 | 61.0 | 100.9 | 96.2 |
| $Ca_2P_2O_7$ | 18.0 | 35.9 | 24.2 | 52.3 | 15.2 |
| $CaCO_3$ | 1.1 | 2.2 | | | 7.8 |

Table II.—A COMPARISON OF REDUCTION IN TOOTH ENAMEL SOLUBILITY DATA FOR $SnF_2$ WHEN COMBINED WITH 3 DIFFERENT CLEANING AND POLISHING VEHICLES (AT 1000 r.p.m. $F^-$)

| Cleaning and Polishing Vehicle | Rat ESR, Percent Red. | Human Whole Tooth ESR, Percent Red. |
|---|---|---|
| None | 50.5 | 78.3 |
| $ZrSiO_4$ | 48.2 | 70.0 |
| $Ca_2P_2O_7$ | 11.6 | 37.2 |
| $CaCO_3$ | 12.5 | 4.6 |

Table III.—A COMPARISON OF REDUCTION IN TOOTH ENAMEL SOLUBILITY DATA FOR $SnZrF_6$ WHEN COMBINED WITH 3 DIFFERENT CLEANING AND POLISHING VEHICLES (AT 1,000 p.p.m. $F^-$)

| Cleaning and Polishing Vehicle | Rat ESR, Percent Red. | Human Whole Tooth ESR, Percent Red. |
|---|---|---|
| None | 30.5 | 81.0 |
| $ZrSiO_4$ | 24.3 | 78.9 |
| $Ca_2P_2O_7$ | 18.3 | 52.8 |

Table IV.—$SnF_2$ and $SnZrF_6$ PROPHYLACTIC PASTES (AT 20,000 p.p.m $F^-$)

| Cleaning and Polishing Vehicle | $SnF_2$ | | $SnZrF_6$ | |
|---|---|---|---|---|
| | Human Whole Tooth ESR, Percent Red. | Rat ESR, Percent Red. | Human Whole Tooth ESR, Percent Red. | Rat ESR, Percent Red. |
| $ZrSiO_4$ | 91.5 | 73.8 | 90.2 | 76.4 |
| Lava Pumice | 82.8 | 62.8 | 79.3 | 75.6 |
| $MgSiO_4$ | 73.0 | | | |
| Flour of Pumice | 79.1 | | | |
| $CaCO_3$ | 50.8 | | | |
| $CaSiO_4$ | 10.4 | | | |

What is claimed is:

1. A prophylactic paste composition comprising 0.50–2.4 parts by weight of zirconium silicate as a cleaning and polishing agent and 0.05–1 part by weight of a fluoride-containing anticariogenic adjuvant.

2. A composition as claimed in claim 1 in which the adjuvant comprises stannous fluoride.

3. A prophylactic paste composition comprising 0.5–2.4 parts by weight of zirconium silicate as a cleaning and polishing agent and 0.2–0.4 part by weight of stannous fluoride.

4. A prophylactic paste base composition adapted for combination with a fluoride-containing anticariogenic adjuvant and comprising the following ingredients in approximate relative parts by weight:

zirconium silicate as a cleaning and polishing agent _____ 50–80
bleaching pigment _____ 1–6
binder _____ 0.1–1
humectant _____ 10–20
flavoring agent _____ up to 2

5. A prophylactic base adapted for combination with a fluoride-containing anticariogenic adjuvant and comprising the following ingredients in relative parts by weight:

zirconium silicate as a cleaning and polishing agent _____ 75–80
titanium dioxide as a bleaching pigment ___ 3.5–4.5
hydroxyethyl cellulose as a binder _____ 0.15–0.25
glycerine as a humectant _____ 16–20
sodium saccharin as a sweetening agent ____ 0.25–0.50

6. A prophylactic method for reducing the cariogenic potential of teeth comprising the application thereto of a freshly prepared composition comprising 0.5–2.4 parts by weight zirconium silicate as a cleaning and polishing agent and 0.05–1 part by weight of a fluoride-containing anticariogenic adjuvant admixed with 1 part by weight of water.

7. A method as claimed in claim 6 in which the adjuvant comprises stannous fluoride.

References Cited by the Examiner

UNITED STATES PATENTS

| | | | |
|---|---|---|---|
| 2,427,799 | 9/1947 | Maloney | 51—308 |
| 2,941,926 | 6/1960 | Salzmann et al. | 167—93 |
| 3,105,013 | 9/1963 | Saul et al. | 167—93 |
| 3,124,512 | 3/1964 | Schmid et al. | 167—93 |
| 3,151,027 | 9/1964 | Cooley et al. | 167—93 |

FOREIGN PATENTS 180,531  1/1936  Switzerland.

LEWIS GOTTS, *Primary Examiner.*

FRANK CACCIAPAGLIA, Jr., *Examiner.*

RICHARD L. HUFF, *Assistant Examiner.*